Patented Nov. 1, 1927.

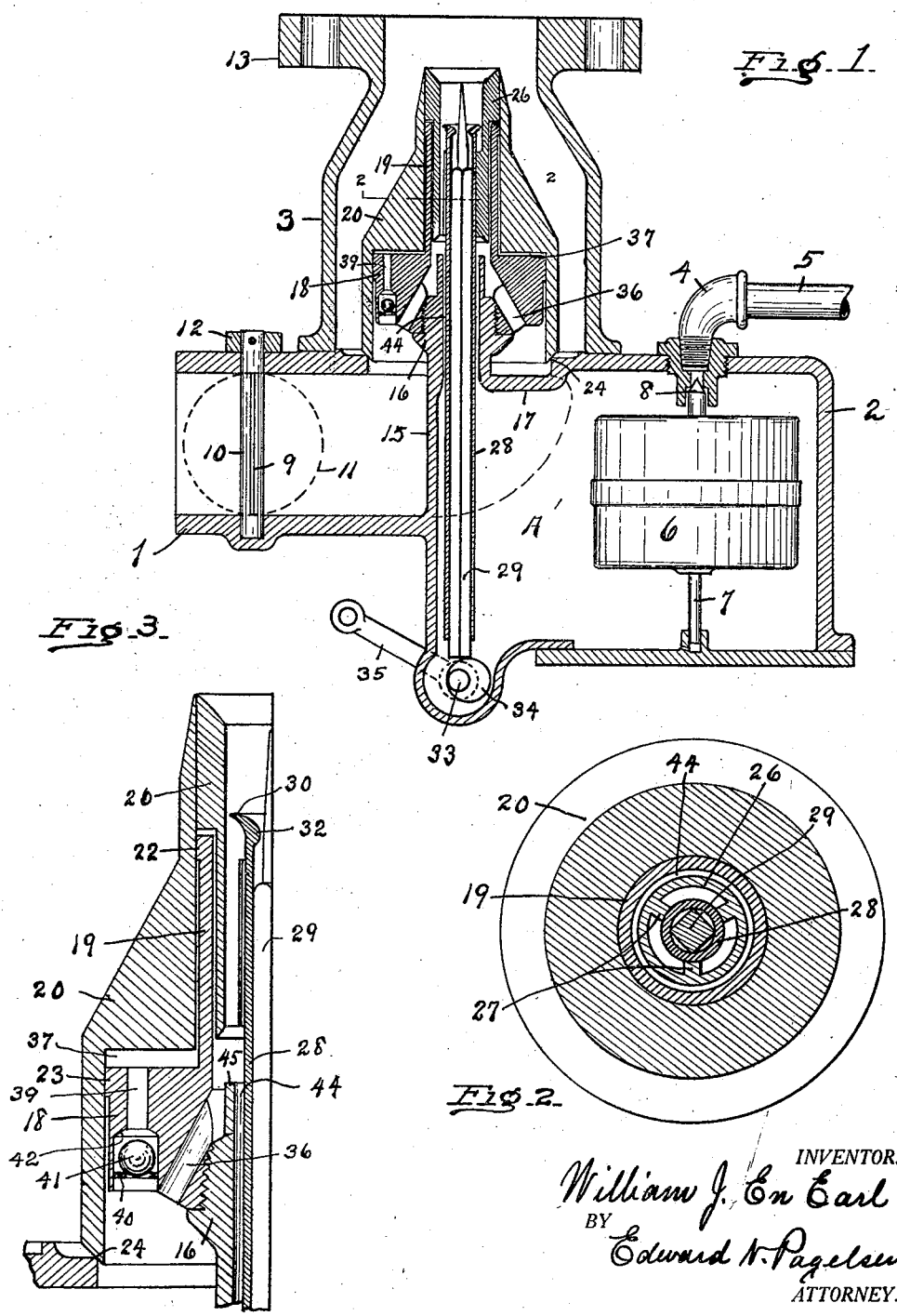

1,647,400

UNITED STATES PATENT OFFICE.

WILLIAM J. EN EARL, OF ANN ARBOR, MICHIGAN.

CARBURETOR.

Application filed February 20, 1925. Serial No. 10,469.

This invention relates to devices for so combining liquid hydro-carbons with air that a substantially gaseous fuel for internal combustion engines shall be produced, and its object is to provide a carburetor whereby the liquid fuel may be drawn directly from a supply tank, and in which the proportions of the air and liquid constituting the fuel will be kept substantially contant irrespective of the amount produced; and in which these proportions can be varied by manually operable parts of the carburetor.

In the accompanying drawing, Fig. 1 is a central vertical section of my improved carburetor. Fig. 2 is a section on the line 2—2 on a larger scale. Fig. 3 is a reproduction of a part of Fig. 1 on a larger scale.

Similar reference characters refer to like parts throughout the several views.

This carburetor comprises an air inlet passage 1, a float chamber 2, a mixing chamber 3, a connection 4 to receive the supply pipe 5 which extends to the fuel tank, a float 6 having a stem 7 guided at both ends and formed with a valve 8 at its upper end, and a throttle valve 9 on its shaft 10 which may be turned from the position shown in solid lines in Fig. 1 to that shown at 11 in dotted lines by a crank 12 or any other suitable means. These parts are not generally novel. The float 6 prevents the fuel from rising higher than the line A. A flange 13 may be used to secure the carburetor to the inlet passage of the engine.

A portion of the float chamber projects into the air intake the portions 15 and 17 of the wall of the float chamber supporting the head 16. On this head is secured a piston 18 and an upwardly extending sleeve 19 preferably integral therewith. The air valve 20 is slidable on this piston and sleeve, the piston and sleeve being reduced to leave only lands 22 and 23, in order to reduce the friction and yet maintain a close joint.

Secured within the air valve is a sleeve 26, whose upper end tightly fits the air valve and whose lower portion is reduced to leave space for the sleeve 19, on the piston 18. The sleeve 26 has inwardly extending ribs 27 Fig. 2 which engage the nozzle tube 28 which is moved up and down by this sleeve 26 and the air valve.

The nozzle tube 28 extends down into the float chamber so as to constitute a guide for the metering pin or fuel valve 29, which is generally square in cross-section except at its upper end where it is conical. The tube has a flaring upper lip 30 to constrict the passage within the sleeve 26, and an internal rib 32 which, together with the metering pin, controls the fuel. A shaft 33 having a cam 34 and a handle 35 may be manually turned to move the metering pin up or down.

The piston 18 is provided with primary air passages 36. The air in the space 37 between the piston and air valve acts as a cushion to prevent sudden movements of the air valve. A small passage 39 in the piston is controlled by a ball 41 which is held in position by a pin 40. When the air valve attempts to rise suddenly as under a sudden opening of the throttle, a current of air will lift this ball and push it against the seat 42 above it, thus closing the passage and restraining the upward movement of the air valve. This construction therefore constitutes a dash pot for the air valve to restrain the quick upward movement of the air valve upon sudden opening of the throttle but permits quick descent of the air valve when the throttle is closed. The air valve will therefore rise and fall slowly with the opening and closing of the throttle and the flow of liquid fuel out of the nozzle tube 28 will increase and decrease with this use because the effective area between the rib 32 and the metering pin increases and decreases therewith.

Should the operator wish to lean his mixture, he swings down the lever 35 which raises the metering pin and reduces the effective area of the fuel nozzle. The mixture is enriched by moving this arm in the opposite direction.

The parts being in the position shown, a reduction of pressure occurs within the chamber 3, and this reduction of pressure extends down the passage between the sleeve 26 and the nozzle tube 28 to the upper ends of the primary air passages 36. It will also extend down the space 44 within the head 16 and into the float chamber and thence through the connection 4 and pipe 5 to the fuel tank, resulting in a flow of fuel therefrom to the float chamber. This reduction of pressure also causes a flow of air through the passages 36 and up around the nozzle shaped top 45 of the head 16, producing an aspirating effect at the upper end of the space 44. The air passes up within the sleeve 26 and through the reduced area around the lip 30 so that a greater reduction of pressure occurs just above the lip than at the point 45. The fuel will therefore flow upward from the float chamber and out the upper end of the nozzle tube 28, in spite of the reduced pressure in the float chamber.

The suction effect at the upper end of the nozzle tube 28 is as much greater than at the passage 44 as the area of the passage between the members 18 and 45 is greater than the area of the space between the lip 30 of the nozzle tube and the inner cylindrical surface of the sleeve 26, the velocity heads at these two points causing these differences in suction effect.

Air being much more mobile than the liquid fuel, the dash pot construction serves to retard the sudden increase and decrease of air until the fuel can respond to the variations in air pressures in the mixing chamber. This therefore ensures a richer mixture at the beginning of acceleration than would be possible if the air valve were not retarded. The rush of air through the primary passages 36, due to the opening of the valve 9 and the retarded movement of the air valve will result in a greater difference in pressures at 30 and 45 and therefore in a greater flow of fuel from the nozzle tube.

A slow opening of the throttle will not cause the ball 41 to seat at 42 so that air will freely flow up the passage 39 to the space 37, permitting the valve 20 to rise. The air valve will therefore respond to slow openings of the throttle valve but will not move suddenly to respond to quick openings thereof. The area of the chamber 37 is the effective lifting area of the air valve.

The air valve by its weight serves to preserve a predetermined ratio between the pressure within the fuel chamber above the fuel therein and at the discharge end of the fuel nozzle so that the fuel will flow up the fuel nozzle no matter how great the suction on the supply pipe 5 extending to the fuel tank.

The details of construction and the proportions of the parts may all be changed by those skilled in this art without departing from the spirit of my invention as set forth in the following claims.

I claim:

1. In a carburetor, the combination of a float chamber, a stationary head formed with primary air-passages and a vertical passage connecting the discharge of the primary air-passages to the interior of the float chamber, a vertically movable air valve and a nozzle tube carried thereby and extending into the float chamber through the vertical passage in the head, the area of the opening around the discharge end of the nozzle tube being less than the area of the discharge of said primary air-passages, and an anterior throttle to control the flow of air into said carburetor.

2. In a carburetor, the combination of a float chamber, a nozzle tube extending upward from the lower portion of the float chamber, an air valve and a support therefor formed with primary air passages, a passage extending from the discharge of said primary air passages to the float chamber, said air valve surrounding the upper end of the nozzle tube and constituting a continuation of the primary air passage, the effective area of the primary air passage at the upper end of the nozzle tube being less than the area of the discharge of the air passages, and an anterior throttle to control the flow of air into said carburetor.

3. In a carburetor, the combination of a float chamber, a nozzle tube extending upward from the lower portion of the float chamber, an air valve and a support therefor formed with primary air passages, a passage extending from discharge of the said primary air passages to the float chamber, said air valve surrounding the upper end of the nozzle tube and constituting a continuation of the primary air passage, the effective area of the primary air passage at the upper end of the nozzle tube being less than the area of discharge of the air passages and means to control the flow of air through said carburetor, a metering pin within the nozzle tube to control the flow of fuel therefrom, and means to move the metering pin to regulate said flow, and an anterior throttle to control the flow of air into said carburetor.

4. In a carburetor, the combination of a body having inlet and outlet passages, means to control the pressure in said inlet passage, an air valve mounted within the carburetor and adapted to be moved by the suction to permit secondary air to pass from the inlet to the outlet passages and to cause the pressure within the outlet to be a predetermined amount less than the pressure within the inlet passage, said carburetor also having a primary air passage connecting the inlet and outlet passages, the effective area of the discharge end of said primary air passage being reduced, a nozzle in said primary air passage, a closed float chamber, a fuel tube extending therefrom and connecting to said nozzle and means for regulating the flow of fuel therefrom, said carburetor being formed with a passage directly connecting a portion of the primary air passage which is beyond the point of separation of the primary and secondary air passages to the float chamber.

5. In a carburetor, a float chamber, a body having inlet and outlet passages and a supporting head formed with a restricted air passage and another passage connecting the discharge of said restricted passage to the float chamber, a throttle valve in the inlet passage, a weighted air valve slidably mounted in said body and having a central passage connecting at one end to the air passages in said head, and a fuel nozzle extending up from the float chamber into said central passage in the air valve, and means for regulating the flow of fuel therefrom, the effective area of said passage being reduced at its discharge end to a lesser area than that of the discharge of said restricted passage in said head, so as to reduce the pressure at such discharge end of the fuel nozzle.

WILLIAM J. EN EARL.